(No Model.)  2 Sheets—Sheet 1.

A. N. SIMMERLY.
COMBINED CLUTCH AND BRAKE.

No. 312,911. Patented Feb. 24, 1885.

WITNESSES
Phil C. Dieterich
Geo. C. Poulton

INVENTOR
Albert N. Simmerly
H. Clay Smith
By his Attorney (No Model.) 2 Sheets—Sheet 2.

A. N. SIMMERLY.
COMBINED CLUTCH AND BRAKE.

No. 312,911. Patented Feb. 24, 1885.

WITNESSES:
Phil C. Dieterich
Geo. C. Poulton

INVENTOR:
Albert N. Simmerly
H. Clay Smith
By his Attorney

N. PETERS. Photo-Lithographer, Washington, D. C.

UNITED STATES PATENT OFFICE.

ALBERT N. SIMMERLY, OF CLEVELAND, OHIO.

COMBINED CLUTCH AND BRAKE.

SPECIFICATION forming part of Letters Patent No. 312,911, dated February 24, 1885.

Application filed January 17, 1885. (No model.)

*To all whom it may concern:*

Be it known that I, ALBERT N. SIMMERLY, a citizen of the United States, residing at Cleveland, in the county of Cuyahoga and State of Ohio, have invented certain new and useful Improvements in Clutch and Brake Mechanisms; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a combined clutch and friction brake; and the novelty consists in the construction, arrangement, and adaptation of parts, as will be more fully hereinafter set forth, and specifically pointed out in the claims.

The essential object of the invention may be said to be to provide a clutch which, by the action of a single lever, will throw the power into engagement, and which will, by means of the same lever, not only throw the power out of engagement at will, but also automatically apply an adjustable friction-brake to the mechanism to stop its momentum after the power has been disengaged or to allow its backward movement to be completely under the control of the shipping-lever, all of which will be clearly set forth.

For convenience I will show and describe the invention as applied to a hoisting and lowering machine; but it will be evident that the advantages of the invention will accrue to other relations and combinations.

The invention is illustrated in the accompanying drawings, which form a part of this specification, and in which—

Figure 1:
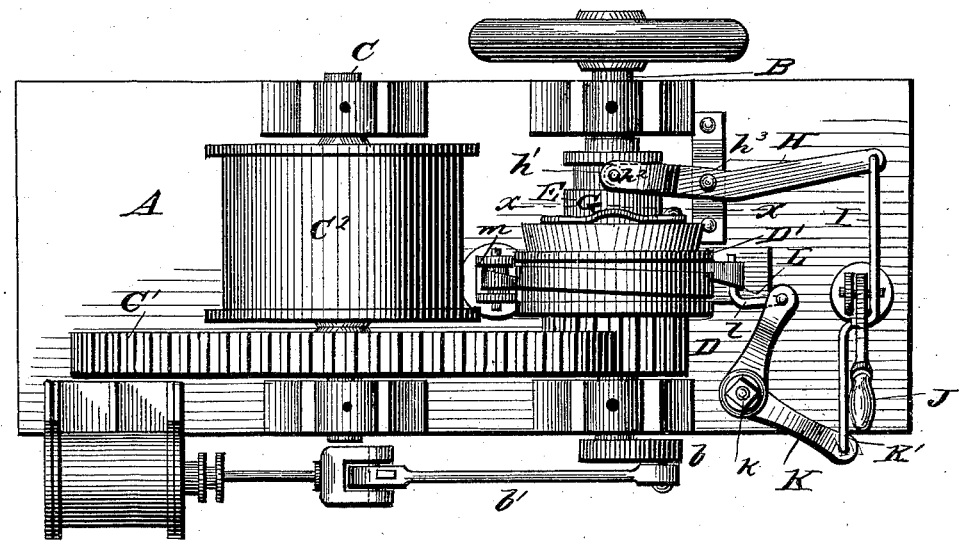
Figure 2:
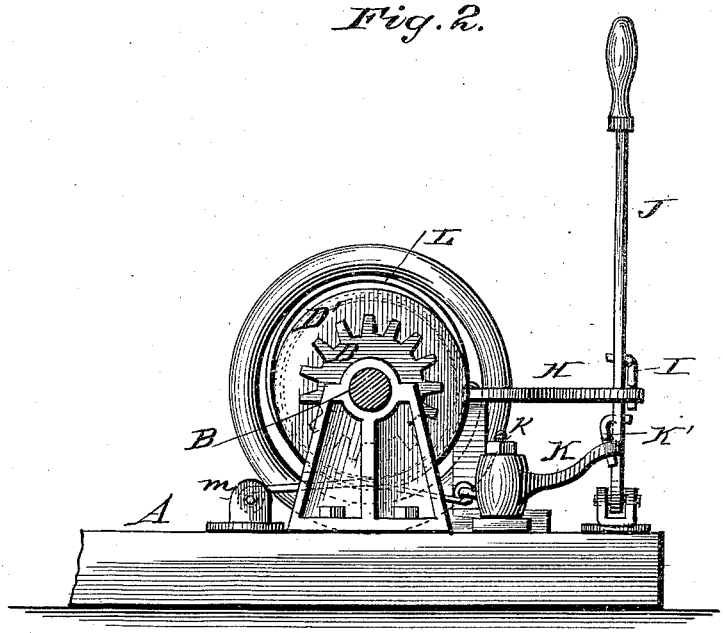
Figure 3:
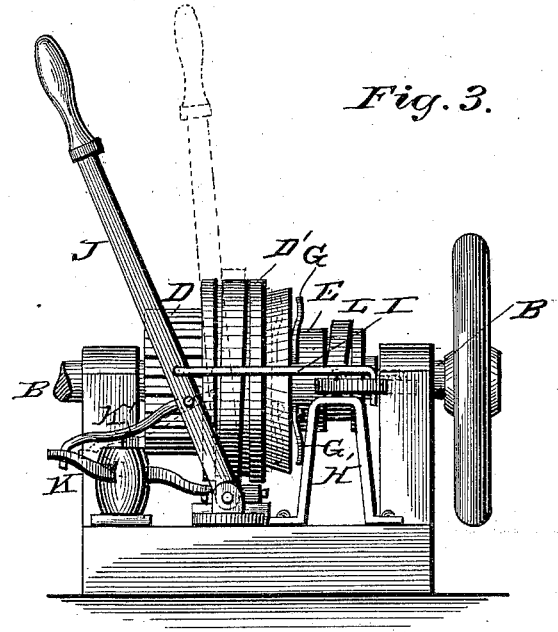
Figure 4:
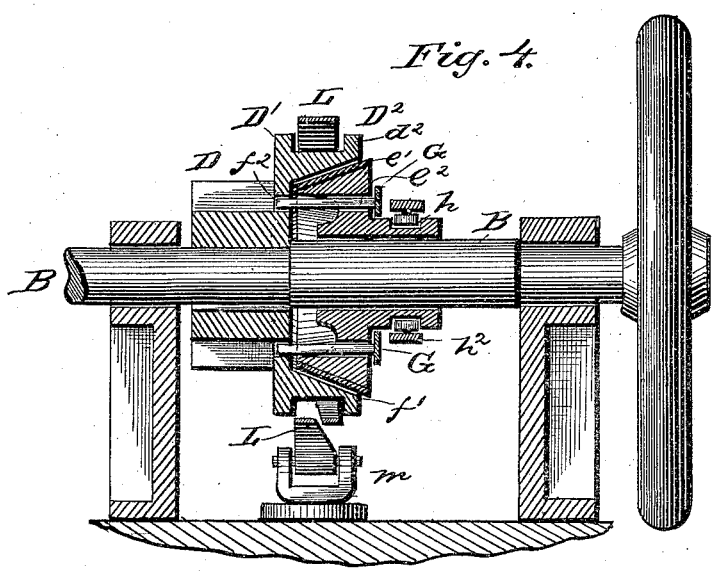
Figure 5:
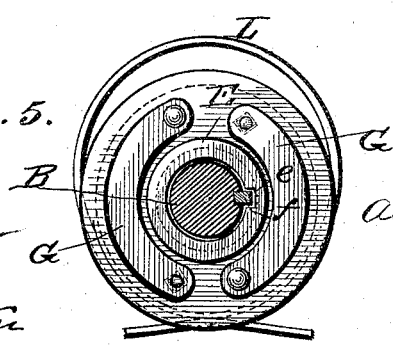

Figure 1 is a top plan view; Fig. 2, a side elevation showing in dotted lines the position of the brake-band when the clutch is "on," and in full lines the position when the clutch is out of engagement or "off." Fig. 3 is a rear elevation showing the two positions of the shipping and brake lever, that in full lines denoting its position when the clutch is off, and that in dotted lines showing its position when the clutch is on and the brake off. Fig. 4 is a section showing the construction of the clutch mechanism; and Fig. 5, a vertical section taken on the line $x\ x$ of Fig. 1.

Referring to the drawings, in which similar letters of reference indicate like parts in all the figures, A designates a frame, in which is properly journaled the power-shaft B and the drum-shaft C. A rigid crank, $b$, on the main shaft B, is loosely connected to a pitman, $b'$, which in turn is pivoted to the piston rod of an engine or other well-known source of power.

Rigid upon the drum-shaft is a multiplying-gear, $C'$, which meshes with a gear, D, loosely hung upon the shaft B and having a sleeve, $D'$, provided with a friction-rim, $D^2$, having side flanges, $d^2$.

$C^2$ designates the drum.

With the exception of the brake-friction surface $D^2$, the parts enumerated may be of any approved and suitable construction, size, and arrangement.

The clutch mechanism consists of a male and a female portion, each being loosely mounted on the shaft B. The female portion of the clutch is formed in the sleeve $D'$, and has free rotary motion on the shaft B, while the male portion E has free longitudinal movement on said shaft, but is forced to revolve with it by reason of the engagement in a groove, $e$, therein of a spline, $f$, formed on the shaft B, as shown. The male clutch E has a beveled frictional surface, $e'$, which engages and corresponds with a similar portion, $f'$, in the sleeve $D'$, and it carries two oppositely-arrranged sliding pins, $e^2$, which engage apertures $f^2$ formed in the sleeve, when the parts which form the clutch are locked to each other, thus forming a positive clutch. Springs G, secured upon the face of the clutch portion E, bear upon the outer ends of the pins $e^2$ and hold them with a constant force in the direction of their apertures $f^2$, but allow them to slide longitudinally, as the parts $D'$ E are brought together, until the pins come opposite their apertures.

The operation of the parts thus far described will be obvious.

When the parts $D'$ and E are not into engagement, the part $D'$ is idle, and the power of the continually-revolving shaft B is not transmitted to the drum $C^2$. When, however, the part E of the clutch is forced into contact with the part $D'$, the friction-surfaces $e'\ f'$ engage, and the sleeve D' is forced to partake of the motion of the shaft. The pins slide in their bearings by the action of the springs G until they come opposite their seats $f^2$, when the springs force them into a positive engagement, and securely lock the parts D' E together, the part D' by this time, however, having partaken of the rotary motion of the shaft B, to prevent a shock from the locking engagement. As thus conditioned, the drum $C^2$ receives motion from the shaft B, and the hoisting-rope (not shown) is wound thereon, thereby elevating the load to a sufficient height, when the clutch mechanism is disengaged and the drum mechanism becomes idle so far as the power of the shaft B is concerned.

To prevent the unwinding of the drum by the suspended weight, I provide a peculiar brake-band, which operates upon the friction-surface $D^2$ of the clutch, and which is operated by the same lever which operates the clutch.

In the sleeve of the male clutch E is formed an annular groove, $h$, which receives pins $h'$ held in the jaws $h^2$ of a lever, H, pivoted at $h^3$ upon a standard, H', as shown. By a link, I, this lever is connected to the operating-lever J; hence, as this lever J, which is arranged vertically and is pivoted below, is forced to the right, as seen in Fig. 3, in dotted lines, the clutch is on, and when forced to the left, as seen in full lines in said figure, the clutch is off.

Pivoted at $k$ is an elbow-lever, K, from one arm of which a rigid link, K', serves to connect the same to the operating-lever J, while its other arm is pivotally connected by a link, $l$, to a brake-band, L, one end of which is secured to said link $l$, and the other to a stud or other similar device, as seen at $m$, the body of the band being carried around the periphery of the friction-rim $D^2$ of the sleeve D', so as to lie between its flanges $d^2$. The surface of this pulley may be roughened or otherwise provided so that a proper amount of friction will obtain between the parts L and $D^2$.

It will be observed that a movement of the operating-lever J in either direction, while it imparts a "push" motion to one of the connecting rigid links I or K', imparts a "pull" motion to the other; hence the movement of said lever to the right to throw the clutch mechanism into engagement operates automatically to release the friction between the brake-band and rim $D^2$, while a movement of said lever to the left to throw the clutch mechanism out of engagement automatically and quickly throws the brake-band into such frictional contact with the drum mechanism as not only to hold the drum against movement, but allows the operator to lower the object by graduating the friction to suit the occasion. In this provision for checking and controlling the action of the drum mechanism by the same motion which releases the said mechanism from the power lies the gist of this invention.

Modifications in details of construction may be made without departing from the principle or sacrificing the advantages of the invention as herein set forth.

Having thus described the invention, what I claim as new, and desire to secure by Letters Patent of the United States, is—

1. In combination with a clutch having one of its parts, as D, mounted loosely upon the shaft B, having a sleeve, D', provided with a friction-rim and connected with a drum mechanism, as C' $C^2$, a brake-band embracing the said friction-rim and connected with the shipping-lever, as J, and clutch mechanism, as set forth.

2. In combination with the drum mechanism, as described, and with the clutch-sleeve D', having friction-rim $D^2$, the brake-band L, embracing the said friction-rim $D^2$, the clutch-shipping mechanism, and the lever J, and connections whereby the brake is applied by the movement of the lever which disengages the clutch, and the brake may be adjusted to unwind the drum at will, as set forth.

3. The combination, with the drum mechanism and the clutch mechanism comprising the parts D' $D^2$ E, as described, of the lever H, elbow-lever K, brake-band L, and rigid links K' I, and the single operating-lever J, as and for the purposes set forth.

4. The gear D, having sleeve D', brake friction-rim $D^2$, friction-surface, $f'$, and locking apertures $f^2$, and the clutch portion E, having friction-surface $e'$, pins $e^2$, and springs G, the brake-band L, the lever J, and connections, as and for the purposes set forth.

5. In combination with the sleeve D', having gear-connections with a winding-drum, a brake friction-rim and friction and locking seats, and with the clutch portion E, having friction-surface and locking-pins controlled by springs G, the levers H K, links I K', brake-band L, and operating-lever J, as and for the purposes set forth.

In testimony whereof I affix my signature in presence of two witnesses.

ALBERT N. SIMMERLY.

Witnesses:
 SAM. FLEXTER,
 J. A. CONWAY.